United States Patent Office 3,085,144
Patented Apr. 9, 1963

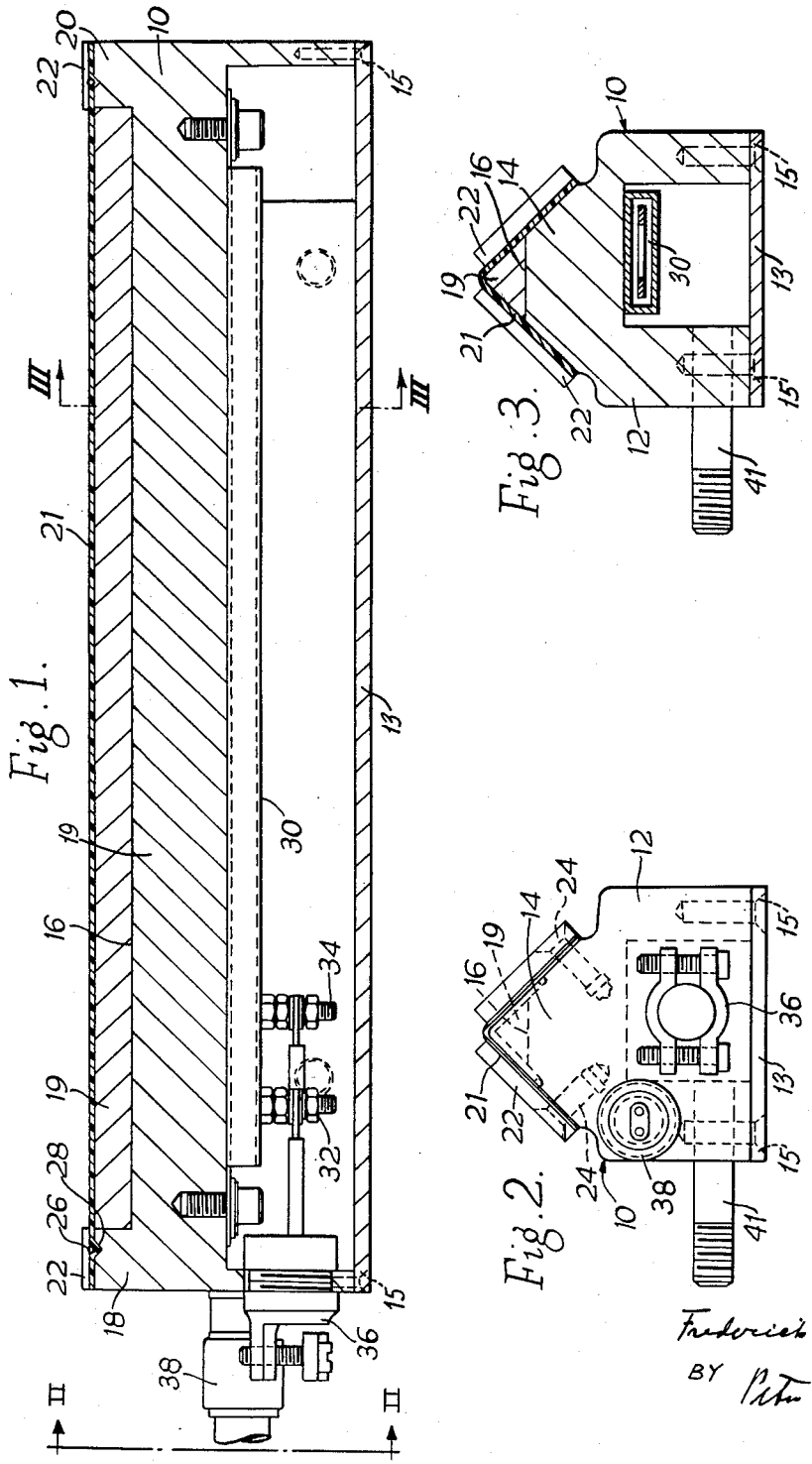

3,085,144
SEALING MEANS FOR WRAPPING MACHINES
Frederick D. Bate, Nelson, England, assignor to Clavell
Bate & Nephews Limited, Nelson, England
Filed Sept. 20, 1960, Ser. No. 57,266
5 Claims. (Cl. 219—19)

In wrapping machines in which two or more layers of wrapping material are to be heat-sealed, what is known as a dab heater is frequently employed. A dab heater comprises a heated member which is movable towards and away from the package to be sealed so that it can be pressed against the part to be heat-sealed. Dab heaters as at present in use, are entirely satisfactory where the wrapper layers to be sealed overlie a smooth surface of the wrapped article. Difficulties arise when the wrapped article has an uneven surface, or where two articles of different sizes are disposed side by side within the package, because in such circumstances the dab heater will not make continuous contact with the wrapped package and the sealing will be interrupted.

The present invention is designed to provide a dab heater which is capable of conforming with irregular surfaces.

According to the invention, a dab heater has a flexible and/or resilient contact member engagement with a wrapped package, a filler beneath said contact member, said filler being of a material which is solid at normal atmospheric temperatures, but liquid at temperatures approximating to 100° C., and means for heating the contact member. It is preferred that the contact member should comprise a sheet of silicone rubber or glass fibres or glass cloth impregnated or coated with silicone rubber or polytetrafluorethylene. Silicone rubber either alone or with glass fibres or glass cloth is preferred for use in heat-sealing polythene film as it has less tendency to stick to the polythene than most other resilient or flexible materials.

One construction of a dab heater for use in a wrapping machine will now be described by way of example only, with reference to the accompanying drawings in which:

FIGURE 1 is a longitudinal section through a dab heater,

FIGURE 2 is an end view looking in the direction of arrow II in FIGURE 1, and

FIGURE 3 is a section on the lines A—A in FIGURE 1.

The heater has a body 10 made in cast aluminium or other metal having a good heat resistance and its length depends upon the length of the seal which is to be made, but as shown in the drawings, it has a lower portion 12 which is rectangular in cross section, and an upper portion 14 which is triangular in cross section. The lower portion 12 of the body is hollow, and the upper portion is solid, but a triangular groove 16 is formed along the top edge of the central portion 19 between solid end portions 18 and 20. A cover plate 13 is attached to the body 10 by screws 15 to close the hollow portion 12.

The triangular groove 16 is filled with a substance 19 which is solid at normal atmospheric temperatures, but of low temperature melting point (e.g. approximately 100° C.) and which is also a good conductor of heat. A low melting point metal or alloy is suitable for this purpose. The upper surfaces of the upper portion 14 are covered by a sheet 21 of flexible heat resisting material, which is clamped in position by plates 22 and screws 24, the sheet being stretched endwise during fitting by means of circular rods or wires 26 on the undersides of the plates 22, these rods pressing the sheet 21 into grooves 28 provided for that purpose in the converging edges of end portions 18 and 20. Suitable materials for the sheet 21 include, glass cloth coated or impregnated with silicone rubber or polytetrafluorethylene, silicone rubber mixed with glass fibre, or silicone rubber alone.

An electric heating element 30 is fixed to the ceiling of the hollow lower portion 12 and has terminals 32 and 34, and a cable 36 is provided at one end of the heater body so that an electric cable can be connected to the heater. A resistance bulb temperature control device 38 is secured to the same end of the body 10 as the gland 36, and is connected to the electric supply circuit to regulate the temperature of the heater.

The dab heater is mounted by studs 41 to a suitable support (not shown) for movement towards and away from a wrapped package in the usual manner and is arranged so that the flexible sheet 21 will engage with the wrapper where sealing is to be effected. As the sheet 21 and the filling 18 is resilient and flexible, and the substance within the groove 16 will also be in a fluid state when the dab heater is at its working temperature, the sheet 21 will conform to the shape of the package when pressed into engagement.

The dab heater is primarily intended for base seals, that is where there are two overlapping layers of the wrapper to be heat sealed together. However, by carefully controlling the temperature and the time it is in contact with the wrapped package, it may be possible to seal more than two layers of wrapping material. Although the dab heater is particularly designed for sealing polythene film, it can also be used with other thermoplastic materials.

I claim:

1. A dab heater for wrapping machines comprising a body member having a groove in its upper part and a hollow lower part; a metallic substance which is solid at normal atmospheric temperatures but liquid at temperatures exceeding 100° C., filling said groove, a pair of end portions having grooved edges positioned one at each end of said body member, an imperforate sheet of deformable and resilient material covering said groove and extending over said grooves in said end portions, flexible wires pressing parts of said sheet into said grooves in said end portions; retaining means pressing said wires into said grooves; and means for heating said material filling said groove.

2. A dab heater as claimed in claim 1, wherein said end portions have edges converging towards each other away from said body member.

3. A dab heater for wrapping machines comprising a metal body member, having a hollow lower portion; an electric heating element disposed within said lower portion and contacting part of said body member; a plate attached to said body member, closing said hollow portion; a pair of triangular end portions projecting upwardly from said body portion and grooved in their converging edges; an imperforate thin sheet of material extending over said end portions and part of said body portion, whereby said body portion said end portions and said sheet together define a space triangular in cross-section; a pair of flexible wires engaging said sheet and pressing parts of said sheet into said grooves in said end portions; retaining members clamping said sheet to said body member and pressing said wires into said groves; and a filling within said space said filling comprising a metallic material which is solid at normal atmospheric temperatures, but liquid at temperatures approximately to 100° C.

4. A dab heater for wrapping machines comprising a body member including spaced mutually opposed triangular end portions extending outwardly beyond a central portion to form therewith a triangular groove; a liquid-tight sheet of resilient deformable material stretched between said triangular end portions to form a ridge therebetween and overlapping said central portion; means for securing the sheet to the body member in liquid-tight relationship therewith; a heat conductive substance which is a liquid at temperatures exceeding 100° C. filling the groove between the sheet and the body member, and means for heating the body member attached thereto adjacent the groove.

5. A dab heater for wrapping machines comprising a body member having an edge with a groove therealong; a liquid-tight resilient sheet of silicone rubber stretched over the body member and clamped thereto around said groove to provide a sealing edge along the intersection between two resilient surfaces of the sheet; a metallic substance which is solid at normal atmospheric temperatures but liquid at temperatures exceeding 100° C. filling said groove; and means for heating said material.

References Cited in the file of this patent

UNITED STATES PATENTS

| | | |
|---|---|---|
| 963,892 | Haskins | July 12, 1910 |
| 2,090,570 | Claessen | Aug. 17, 1937 |
| 2,352,899 | Karlson | July 4, 1944 |
| 2,609,316 | Fichtner | Sept. 2, 1952 |
| 2,644,151 | Krueger | June 30, 1953 |
| 2,702,334 | Kleist | Feb. 15, 1955 |
| 2,726,707 | Wellons et al. | Dec. 13, 1955 |
| 2,802,086 | Fener | Aug. 6, 1957 |
| 2,834,395 | Russell et al. | May 13, 1958 |
| 2,845,475 | Behr et al. | July 29, 1958 |
| 2,952,001 | Morey | Sept. 6, 1960 |

FOREIGN PATENTS

| | | |
|---|---|---|
| 529,186 | Great Britain | Nov. 15, 1940 |
| 770,111 | Great Britain | Mar. 13, 1957 |